(12) United States Patent
Domlatil

(10) Patent No.: US 9,408,401 B2
(45) Date of Patent: Aug. 9, 2016

(54) DEVICE AND METHOD FOR SEPARATING SAUSAGE CHAINS

(75) Inventor: Miroslaw Domlatil, Reutlingen (DE)

(73) Assignee: INOTEC GMBH MASCHINENENTWICKLUNG UND VERTRIEB, Reutlingen (DE)

( * ) Notice: Subject to any disclaimer, the term of this patent is extended or adjusted under 35 U.S.C. 154(b) by 230 days.

(21) Appl. No.: 13/254,893

(22) PCT Filed: Mar. 8, 2010

(86) PCT No.: PCT/EP2010/001423
§ 371 (c)(1),
(2), (4) Date: Sep. 6, 2011

(87) PCT Pub. No.: WO2010/099981
PCT Pub. Date: Sep. 10, 2010

(65) Prior Publication Data
US 2011/0314980 A1 Dec. 29, 2011

(30) Foreign Application Priority Data
Mar. 6, 2009 (DE) .......................... 10 2009 011 555

(51) Int. Cl.
| | | |
|---|---|---|
| *B26D 5/20* | (2006.01) | |
| *B26D 7/32* | (2006.01) | |
| *B26D 7/06* | (2006.01) | |
| *A22C 11/00* | (2006.01) | |

(52) U.S. Cl.
CPC .............. *A22C 11/006* (2013.01); *Y10T 83/04* (2015.04); *Y10T 83/202* (2015.04); *Y10T 83/541* (2015.04); *Y10T 83/647* (2015.04)

(58) Field of Classification Search
CPC .. A22C 11/006; Y10T 83/647; Y10T 83/541; Y10T 83/04; Y10T 83/202
USPC ............... 83/13, 401, 370, 78, 109, 202, 440, 83/636, 650; 452/49, 51, 21–26, 30–32, 452/35, 36, 46–48; 198/429, 426
See application file for complete search history.

(56) References Cited

U.S. PATENT DOCUMENTS

| | | | |
|---|---|---|---|
| 2,670,498 A | * | 3/1954 | Mosby ............................ 452/50 |
| 3,816,210 A | * | 6/1974 | Aoko et al. .................... 156/290 |
| 4,011,975 A | * | 3/1977 | Brown, Jr. ........................... 226/2 |
| 4,584,740 A | * | 4/1986 | Townsend ........................ 452/31 |
| 5,406,872 A | * | 4/1995 | Conley et al. ................... 83/109 |
| 5,421,137 A | | 6/1995 | Stimpfl |
| 5,857,902 A | * | 1/1999 | Becker et al. ................... 452/49 |
| 6,080,054 A | | 6/2000 | Müller et al. |
| 6,135,869 A | | 10/2000 | Schutz |
| 7,381,123 B2 | | 6/2008 | Bachtle |

(Continued)

FOREIGN PATENT DOCUMENTS

| | | |
|---|---|---|
| CN | 1232619 A | 10/1999 |
| CN | 1328420 A | 12/2001 |

(Continued)

*Primary Examiner* — Ghassem Alie
(74) *Attorney, Agent, or Firm* — Bachman & LaPointe, P.C.

(57) ABSTRACT

In a device for the separation of sausage chains, having a feeding apparatus (1) for feeding sausage chains, with which a separating apparatus (3) for separating the sausage chains into individual sausage chain sections, respectively sausages, is associated and n-fold number of separating apparatuses (3.1 to 3.n) is to be integrated adjacent to each other in the device (P), wherein n≥2.

9 Claims, 1 Drawing Sheet

(56) References Cited

U.S. PATENT DOCUMENTS

| | | |
|---|---|---|
| 7,404,710 B2 | 7/2008 | Le Paih |
| 8,029,840 B2 | 10/2011 | Le Paih |
| 2002/0083816 A1* | 7/2002 | Krauss ............................ 83/932 |
| 2003/0032385 A1* | 2/2003 | Stimpfl ........................... 452/49 |
| 2004/0035276 A1* | 2/2004 | Weber ............................. 83/672 |
| 2004/0052900 A1 | 3/2004 | Le Paih |
| 2007/0295222 A1 | 12/2007 | Dietrich |
| 2008/0163766 A1 | 7/2008 | Meyer |
| 2009/0075577 A1* | 3/2009 | Stimpfl ........................... 452/31 |
| 2010/0068358 A1 | 3/2010 | Le Paih |

FOREIGN PATENT DOCUMENTS

| | | |
|---|---|---|
| CN | 101039584 A | 9/2007 |
| CN | 101147504 A | 3/2008 |
| DE | 2912247 | 10/1980 |
| DE | 4307637 | 12/1993 |
| FR | 2908598 | 5/2008 |
| WO | 02060264 A1 | 8/2002 |

\* cited by examiner

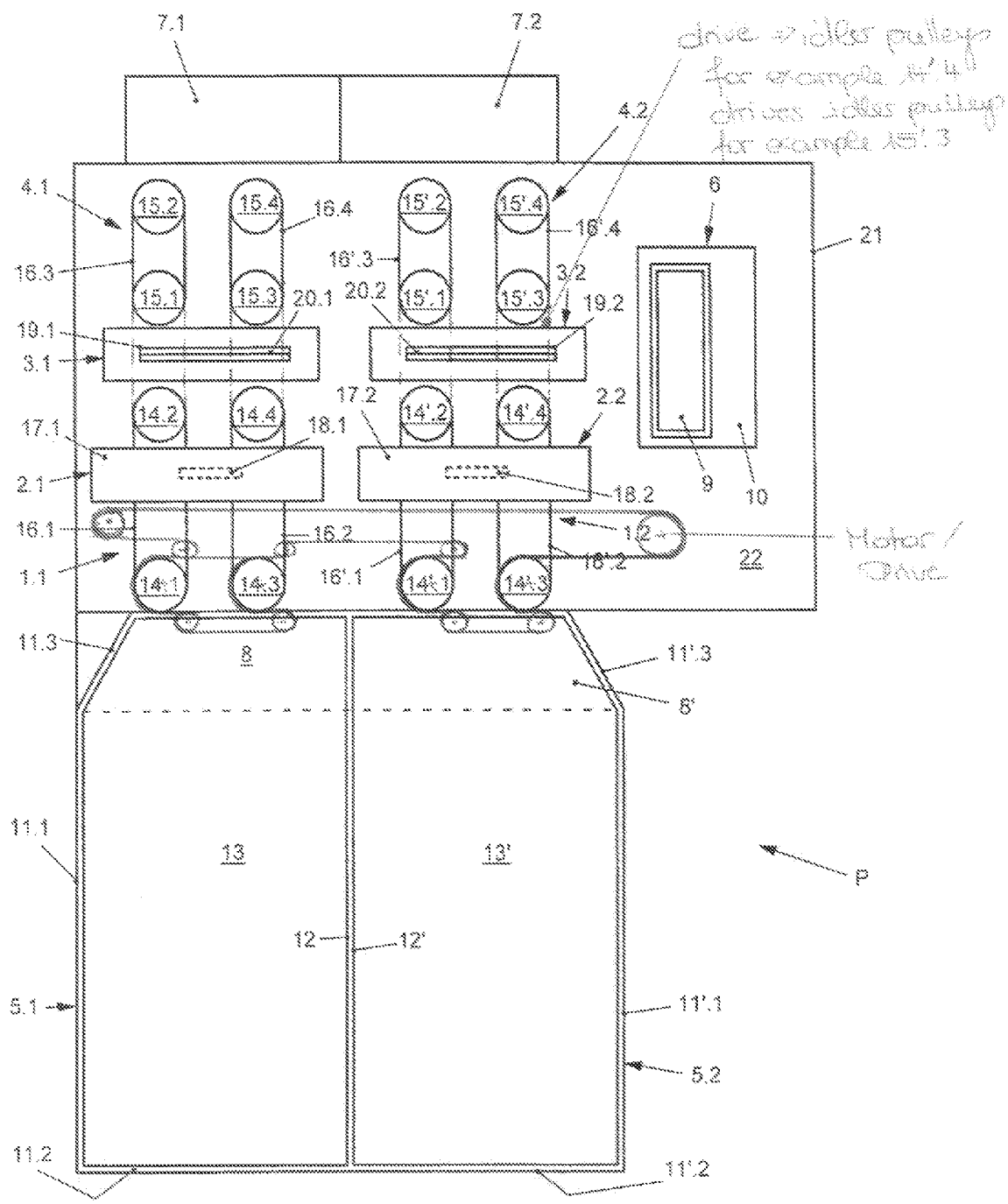

DEVICE AND METHOD FOR SEPARATING SAUSAGE CHAINS

BACKGROUND OF THE INVENTION

The invention refers to a device an a corresponding method for the separation of sausage chains, having a feeding device for feeding sausage chains, with which a separating apparatus for separating the sausage chains into individual sausage chain sections or sausages is associated.

Currently, the production of sausages is carried out by filling an intestine, being a natural or a synthetic intestine, with the respective sausage meat in sausage portions. Between the individual portions the intestine is twisted and/or clips are inserted, thus separating the individual sausages from each other. By this procedure, a sausage chain is formed, from which, for example for automatic packaging, a certain number of sausage chain sections, respectively individual sausages are cut off.

The DE 43 07 637 A1 discloses a device for the separation of individual sausages from a sausage chain at a cutting point utilizing a blade positioned on the shaft of a motor whereas a sensor is prefixed, which generates a light curtain.

The disadvantage with this device is that in each case only one single sausage chain can be separated into its individual sausage chain sections, respectively sausages. In order to separate several sausage chains in parallel/simultaneously, the conventional procedure is to provide several of these devices. In other words several devices are operated and, as appropriate, programmed as well as then simultaneously monitored by several operators. This has the disadvantages that several of those devices have to be purchased and that the programming of each individual device has to be carried out. Additionally, the simultaneous monitoring of these devices is made more difficult for the operator because they often stand in various locations, thus requiring that the operator has to concentrate on several locations simultaneously.

The object of the invention is to avoid the above mentioned disadvantages or at least to reduce them.

SUMMARY OF THE INVENTION

The object is achieved by integrating an n-fold number of separating apparatuses adjacent to each other in the device, wherein n is ≥2.

Providing more than one separating apparatus, meaning at least two separating apparatuses, has the advantage that, for example, only one drive for the separating apparatus is provided. Additionally several separating apparatuses offer the possibility to process several sausage chains in parallel. Besides that the separating apparatuses each do not need to be programmed separately when having the same types of sausage chains which need to be separated into the same sections of equal length. In other words, the same programming can be applied for an n-fold number of separating apparatuses.

Due to the circumstance that several separating apparatuses are driven by one common drive, and in addition to other advantages, a more cost effective device can be manufactured, since all in all fewer components are required.

In another embodiment of the device supply devices have been prefixed to the respective separating apparatus, which have an n-fold number of compartments for an n-fold number of sausage chains, which are positioned substantially parallel to each other. This has the advantage that an operator can provide several sausage chains in parallel, so that less personnel is required.

Additionally, due to the n-fold number of supply devices, which are positioned next to each other, a better monitoring of the device is possible.

In a preferred embodiment, subsequent to each supply device, there is a feeding apparatus to feed the sausage chains into the respective separating apparatus. To this end, the feeding apparatus has a conveyor belt which is guided around guide rollers.

In an advantageous embodiment of the device, each separating apparatus has also a sensor device assigned to it. This, on the other hand, has the advantage that several sensor devices can be controlled via one single control, thus further reducing the production costs of the device according to the invention, compared to a device with only one sensor device and only one separating apparatus.

In a further advantageous embodiment, subsequently to the separating apparatus, a discharge device is connected in series. The discharge device in question may be, as in the case of the feeding apparatus, a conveyor belt, which is guided around idler pulleys. However, other designs of the discharge, respectively, the feeding apparatuses are also conceivable. Essential here is only the fact that a proper feeding and discharging of the sausage chains into, respectively, out of the separating apparatus is made possible.

The object may also be solved by a method by which an n-fold number of sausage chains can be separated essentially in parallel into separate sausage chain sections, respectively sausages, by an n-fold number of separating apparatuses, whereas n is ≥2. The method in accordance with the invention provides for the same advantages as does the device according to the invention, namely, the fact that several n-fold numbers of sausage chains can be separated into corresponding sausage chain sections, respectively, sausages in one and the same process, thus leading to a consequential time saving effect while ensuring a better monitoring of one single device. Thus, the same programming can be used for an n-fold number of separating apparatuses while dealing with basically identical n-fold numbers of sausage chains.

In the method according to the invention, an n-fold number of sausage chains are provided in an n-fold number and also fed in an n-fold number, whereas the method for controlling the device according to the invention controls the separating apparatus via a sensor device in such a manner that the predetermined connections of the individual sausages, respectively, sausage chains sections can be detected, so that the sausage chains are separated into the predetermined/programmed sausage chain sections, respectively, into individual sausages at the detected connections.

Due to the method the device can be set in such a manner that the sausage chains are either separated into a sausage chain section having a predetermined number of sausages, in which sections the sausages remain connected to each other, or into individual sausages.

In an advantageous embodiment, the n-fold number of separating apparatuses may, however, also be programmed in different manners, so that the separation of the one sausage chain at the first separating apparatus takes place at another connecting as in the case of the other sausage chain at the second separating apparatus.

BRIEF DESCRIPTION OF THE DRAWINGS

Further advantages, features and details of the invention follow from the following description of a preferred embodiment, which is illustrated in the drawing:

FIG. 1 shows a top view of a device in accordance with the invention for the separation of sausage chains.

DETAILED DESCRIPTION

As shown in FIG. 1, the device P according to the invention has a supply device 5.1, 5.2 for the separation of sausage chains, after which a feeding apparatus 1.1, 1.2 is connect in series, to which a sensor device 2.1, 2.2 is located, after which a separating apparatus 3.1, 3.2 is connected in series, after which follows a discharge device 4.1, 4.2, to which an output 7.1, 7.2 is adjacent.

In order to separate an n-fold number of sausage chains, the device P may have an n-fold number of devices X.1 to X.n, which are assigned next to each other or in parallel, whereas X is a place holder for references signs 1 to 7.

In the preferred embodiment shown in FIG. 1, the device P is dimensioned for a 2-fold number of sausage chains, which are simultaneously/in parallel to be separated into their separate sausage chain segments, respectively, sausages.

The supply devices 5.1 and 5.2, the feeding apparatuses 1.1 and 1.2, the sensor devices 2.1 and 2.2, the separating apparatuses 3.1 and 3.2, the discharge devices 4.1 and 4.2 and the outputs 7.1 and 7.2 are substantially positioned parallel and/or mirror-symmetrically next to each other. The components of the devices 1.1 to 5.1 are substantially identical with the components of the devices 1.2 through to 5.2 and are indicated by the sign '.

The supply devices 5.1 and 5.2 have lateral circumferential walls 11.1 to 11.3, respectively, 11'.1 through to 11', as well as a separating wall 12, respectively, 12'. In the preferred embodiment, the separating walls 12 and 12' are formed in one single piece. However, it is also conceivable that the supply devices 5.1 and 5.2 are separate apparatuses. Preferably, the supply devices 5.1 and 5.2 are supported on table legs and are movable by the aid of a rolling device being not illustrated herein. The walls 11.1, 11.2 and 12, respectively, 11'.1, 11'.2 and 12' surround a respective bottom area 13.1, respectively, 13.2 of the respective supply device 5.1 and 5.2 and surround the latter substantially in an U-shaped manner. In the supply devices 5.1 and 5.2 the respective sausage chains to be separated are provided, i.e. inserted in such a manner that the feeding apparatuses 1.1 and 1.2 can feed them to the separating apparatuses 3.1 and 3.2.

On the side of supply device 5.1 and 5.2 which faces the feeding apparatus 2.1, respectively 2.2, an input section 8, respectively 8' is provided. In the region of the respective input section 8, 8', the lateral circumferential wall 11.3, respectively 11'.3 is inclined towards the entrance opening of the respective feeding apparatus 2.1, respectively 2.2, thus facilitating a guidance of the individual sausage chains towards the feeding apparatus 1.1, respectively 1.2. The bottom area of the input section 8, 8' can also be inclined slightly upwards or downwards, depending on whether the bottom wall 13.1, 13.2 is positioned above or below the level of a ceiling wall 22 of a housing 21 of the device P. The inclined configuration improves the guidance of the sausage chains to be separated towards the feeding apparatuses 1.1, respectively 1.2.

The feeding apparatuses 1.1 and 1.2 have basically idler pulleys 14.1 to 14.4, around which a conveyor belt 16.1, respectively 16.2 is laid in a paired manner. The feeding apparatus 1.1 is identical in construction to the feeding apparatus 1.2, whereas the individual idler pulleys are indicated by reference signs 14.1' to 14.4' and the conveyor belt by reference signs 16.1' and 16.'2.

Between the idler pulleys 14.1 and 14.2, respectively 14.3 and 14.4, a sensor device 2.1 is provided and between idler pulleys 14'.1 and 14'.4 a sensor device 2.2 is provided, which each has a sensor 18.1, respectively 18.2. The sensors 18.1 and 18.2 are, in each case, positioned in a sensor bridge 17.1, respectively 17.2 However, the sensor bridges 17.1 and 17.2 may also be formed in one single part, so that only one sensor bridge is provided.

The sensor 18.1, respectively 18.2 generates a light curtain with which the connections of the individual sausages in the sausage chains are detected, whereas the signals determined by the sensor unit are processed by a control not illustrated herein, which utilizes a separating apparatus 3 following after the sensor device for controlling.

The control controls the feeding apparatuses 1.1, 1.2, the separating apparatuses 3.1, 3.2 and the discharge device 4.1, 4.2 with the aid of the signals of the sensor devices 2.1, 2.2 and the drives of the respective devices, so that the sausage chains are separated into the desired sections of lengths.

The separating apparatuses 3.1 and 3.2 have a blade slot 19.1, respectively 19.2, out of which a rotatable cutting knife 20.1, respectively 20.2 protrudes in such a manner that the detected connections of the individual sausages in the sausage chain are separated in a controlled manner via the control.

Following the separating apparatuses 3.1 and 3.2, in each case a discharge device 4.1, respectively 4.2 is positioned, by means of which the separated, individual sausage sections, respectively sausages are supplied to the output 7.1, respectively 7.2.

The discharge devices 4.1 and 4.2 are formed substantially similar to each other, as is the feeding apparatus 1.1 and 1.2. The discharge devices 4.1 and 4.2, too, have idler pulleys 15.1 to 15.4, respectively 15'.1 to 15'.4, around which corresponding conveyor belts 16.3 to 16.4, respectively 16.3' to 16.4' are laid for the further transport of the individual sausage sections, respectively sausages towards the outputs 7.1 and 7.2.

Furthermore the device P has an operating device 6, which has a display 9 which is accommodated in a housing 10. Via the display, for example, the transit speed of the sausage chains, and the section length, into which the individual sausage chains are to be separated, can be programmed, displayed and monitored, either for both separating apparatuses at the same time or individually for each separating apparatus.

The invention claimed is:

1. A device (P) for the separation of sausage chains, comprising:
a feeding apparatus (1) for simultaneously feeding an n-fold number of sausage chains, each of the n-fold number of sausage chains having defined connection sites, wherein an n-fold number of separating apparatuses (3.1 to 3.n) are integrated adjacent to each other, the separating devices (3.1 to 3.n) have a common drive, wherein n is ≥2, and for simultaneously separating the n-fold number of sausage chains into individual sausage chain sections or sausages at the defined connection sites, wherein each separating apparatus (3.1 to 3.n) cooperates with a sensor device (2.1 to 2.n) which detects the connection sites of the sausage chains, in order to separate the sausage chains at the detected connection sites, and wherein an n-fold number of sensor devices (2.1 to 2.n) and the n-fold number of separating apparatuses (3) have a common control, wherein the common control controls the feeding apparatuses (1.1, 1.2), the separating apparatuses (3.1, 3.2) and the discharge device (4.1, 4.2) with the aid of the signals of the sensor devices (2.1, 2.2) and the drives of the respective devices, so that the sausage chains are separated into the desired sections of lengths.

2. Device according to claim 1, wherein the separating apparatuses (3.1 to 3.*n*) are positioned next to each other.

3. Device according to claim 2, wherein to the n-fold number of separating apparatuses (3.1 to 3.*n*) a corresponding n-fold number of supply devices (5.1 to 5.*n*) is assigned for the provision of an n-fold number of sausage chains.

4. Device according to claim 1, wherein after each separating apparatus (3.1 to 3.*n*) a discharge device (4.1 to 4.*n*) is connected in series for discharging the sausage chain sections, and sausages separated from the sausage chains.

5. A method for simultaneously separating sausage chains in a device comprising the steps of:
    separating an n-fold number of sausage chains, each of the n-fold number of sausage chains having defined connection sites simultaneously/in parallel by an n-fold number of separating apparatuses (3.1 to 3.*n*) into separate sausage chain sections at defined connection sites whereas n is ≥2.

6. A method according to claim 5, wherein an n-fold number of sausage chains is provided n-fold by means of an n-fold number n of supply devices (5.1 to 5.*n*).

7. Method according to claim 5, wherein an n-fold number of sausage chains is supplied to the n-fold number of separating apparatuses by means of an n-fold number of feeding apparatuses (1.1 to 1.*n*).

8. Method according to claim 5, including providing a sensor device in each case which detects the position of the connection sites of the individual sausages in the sausage chain, whereas depending on the feeding speed of the sausage chain and the detected position of the connection site the separating apparatus is controlled in such a manner that the sausage chain is separated at the detected connection site.

9. Method according to claim 5, wherein the section length of the sausage chains sections to be separated is programmable for each separating apparatus (3.1 to 3.*n*) simultaneously/separately.

\* \* \* \* \*